(12) United States Patent
Belitzky

(10) Patent No.: US 11,446,858 B2
(45) Date of Patent: Sep. 20, 2022

(54) ADDITIVE MANUFACTURING OF IMPROVED THERMO-MECHANICAL COMPOSITE MATERIAL

(71) Applicant: Nano Dimension Technologies, LTD, Nes Ziona (IL)

(72) Inventor: Alik Belitzky, Rehovot (IL)

(73) Assignee: Nano Dimension Technologies, LTD., Nes Ziona (IL)

( * ) Notice: Subject to any disclaimer, the term of this patent is extended or adjusted under 35 U.S.C. 154(b) by 0 days.

(21) Appl. No.: 17/622,776

(22) PCT Filed: Jun. 26, 2020

(86) PCT No.: PCT/US2020/039980
§ 371 (c)(1),
(2) Date: Dec. 24, 2021

(87) PCT Pub. No.: WO2020/264419
PCT Pub. Date: Dec. 30, 2020

(65) Prior Publication Data
US 2022/0203606 A1    Jun. 30, 2022

Related U.S. Application Data

(60) Provisional application No. 62/866,854, filed on Jun. 26, 2019.

(51) Int. Cl.
| | |
|---|---|
| *B29C 64/112* | (2017.01) |
| *B29C 64/393* | (2017.01) |
| *B33Y 10/00* | (2015.01) |
| *B33Y 50/02* | (2015.01) |
| *B29C 64/40* | (2017.01) |
| *C09D 11/52* | (2014.01) |

(Continued)

(52) U.S. Cl.
CPC .......... *B29C 64/112* (2017.08); *B29C 64/393* (2017.08); *B29C 64/40* (2017.08); *B33Y 10/00* (2014.12); *B33Y 50/02* (2014.12); *B33Y 70/00* (2014.12); *C09D 11/101* (2013.01); *C09D 11/52* (2013.01); *B29K 2309/02* (2013.01)

(58) Field of Classification Search
CPC ..... B29C 64/112; B29C 64/393; B29C 64/40; B33Y 10/00; B33Y 50/02; B33Y 70/00; C09D 11/101; C09D 11/52; B29K 2309/02
See application file for complete search history.

(56) References Cited

U.S. PATENT DOCUMENTS

| | | | |
|---|---|---|---|
| 10,254,499 B1 | 4/2019 | Cohen et al. | |
| 2015/0197062 A1 | 7/2015 | Shinar et al. | |
| 2016/0297142 A1* | 10/2016 | Bheda | B33Y 70/00 |

FOREIGN PATENT DOCUMENTS

| | | |
|---|---|---|
| WO | 2008102266 A1 | 8/2008 |
| WO | 2018031186 A1 | 2/2018 |
| WO | 2018140517 A1 | 8/2018 |

* cited by examiner

*Primary Examiner* — Michael M. Robinson
(74) *Attorney, Agent, or Firm* — Guy Levi; The IP Law Firm of Guy Levi, LLC

(57) ABSTRACT

The disclosure relates to systems, methods and compositions for fabricating composite component using additive manufacturing (AM). Specifically, the disclosure is directed to methods, systems and compositions for the fabrication of composite components having improved or modulated thermo-mechanical properties, as well as derivative dielectric strength, using for example, inkjet printing.

14 Claims, 4 Drawing Sheets

(51) Int. Cl.
*C09D 11/101* (2014.01)
*B33Y 70/00* (2020.01)
*B29K 309/02* (2006.01)

ADDITIVE MANUFACTURING OF IMPROVED THERMO-MECHANICAL COMPOSITE MATERIAL

CROSS REFERENCE TO RELATED APPLICATIONS

This patent application is a U.S. National Phase filing of commonly owned and pending PCT Application No. PCT/US20/39980, filed Jun. 26, 2020, which is based on and claims the benefit of the filing date of U.S. Provisional Patent Application Ser. No. 62/866,854, filed Jun. 26, 2019, both which are incorporated herein by reference in their entirely.

BACKGROUND

The disclosure is directed to systems, methods and compositions for fabricating composite component using additive manufacturing (AM). Specifically, the disclosure is directed to methods, systems and compositions for the fabrication of composite components having improved thermo-mechanical properties, using for example, inkjet printing.

Additive manufacturing (AM)—so called "3D printing"—is a general term given to processes that manufacture objects via sequential-layer material addition/joining throughout a 3D work envelope under automated control. ISO/ASTM52900-15 defines seven categories of additive manufacturing processes: binder jetting, directed energy deposition, material extrusion, material jetting, powder bed fusion, sheet lamination, and vat polymerization.

Composite materials produced by AM, typically consist of a continuous matrix, and a dispersed reinforcement material as discontinuous phase, and sometimes an interface or a binder. Physical and mechanical properties, and the microstructure of the composite material can be controlled through the correct choice of the constituent materials and the fabrication method. One of the material extrusion category methods for fabrication of composite materials is Fused Deposition Modeling (FDM). FDM refers to an AM process, in which the object/component is built by feeding a thermoplastic filament into a heated extrusion head. The heated extrusion head melts and deposits the molten thermoplastic material as, for example, a series of beads. Each bead is roughly spherical or cylindrical in shape to build the printed part layer-by-layer. To broaden the assortment of the printed parts, one of the nozzles can be used for a support material. The support material can support overhanging printed components in the final structure that are not directly supported by the build materials. The support material is printed (in other words, deposited, in the same manner as the build materials, but unlike the build materials, the support material is removed after the printing process to give the final 3D part (which, under certain circumstances can incorporate voids).

Likewise, example of powder bed fusion typically involves charging a powder bed housing substrate with powder and selectively fusing portions of the powder as a layer to the substrate, generally with a heat source like a laser, e-beam, or welding device. Once the layer has been developed over the substrate the substrate is withdrawn into the powder bed, the powder bed re-charged with additional powder, and a successive layer fused to the layer previously added to the substrate. The powder generally includes a metal, ceramic, or plastic material of relatively fine consistency and which is readily deposited into the powder using a re-coater device. The re-coater device is typically a blade or roller type device that is operable to displace powder from the a powder source (i.e. a powder reservoir) to the powder bed where, upon delivery, the powder joins residual powder previously delivered to the powder bed and not fused to the underlying substrate when prior layer was added to the substrate. Once the final layer has been added to the structure, the structure is removed from the powder bed for subsequent processing.

The combination of the matrix and the reinforcement material is configured to give a final component that is stronger, lighter, and/or less expensive than the traditional materials while still meeting the specific requirements for its intended application.

Composite materials are also used in production of printed circuit boards (PCB), flexible printed circuits (FPCs), high-density interconnect PCBs (HDIPs) and other additively manufactured electronics (AME). PCBs can be produce for example, by a multistep process that involves photolithography. One of the most common material used to fabricate PCBs is FR-4, a composite material made of an epoxy polymer matrix in which woven fiberglass is embedded. This combination makes the material flame resistant to a certain degree and provides good strength to weight ratios and a considerable mechanical strength Additive manufacturing processes allow for highly complex geometries to be created directly (without tooling) from 3D CAD data, thereby permitting the creation of articles exhibiting high resolution surfaces. While these processes have been useful for detailing various surface properties of produced articles, such processes have struggled to produce complex articles at resolution that is less than 0.2 mm.

Thus, there is a need for compositions, systems and methods enabling efficient and precise fabrication of complex articles of composite component capable of withstanding a wide array of thermos-mechanical conditions, without undergoing deterioration in performance. The disclosed technology addresses some of the above-identified shortcomings.

SUMMARY

Disclosed, in various exemplary implementations, are methods of forming or fabricating 3D composite components using additive manufacturing, for example inkjet printing, as well as exemplary implementations of methods of forming composite materials having improved thermos-mechanical properties.

In an exemplary implementation provided herein is a method for fabricating a reinforced three dimensional (3D) dielectric section of an additively manufactured electronics using inkjet printer comprising: providing an ink jet printing system comprising: a first print head, operable to dispense a first dielectric ink composition; a second print head operable to dispense a second dielectric ink composition, wherein the second dielectric ink composition has a different thermo-mechanical characteristic parameter; a conveyor, operably coupled to the first, and the second print heads configured to convey a substrate to each of the first, and the second print heads; and a computer aided manufacturing ("CAM") module including a central processing module (CPM), in communication with each of the first, and second print heads, the CPM further comprising: at least one processor in communication with a non-transitory storage medium, storing thereon a set of executable instructions configured, when executed to cause the CPM to: receive a 3D visualization file representing the (3D) dielectric section; and generate a file that represents a first, substantially 2D layer for printing the reinforced (3D) dielectric section using the first dielectric ink, and generate a file that represents a second, substantially 2D layer for printing the reinforced (3D) dielectric section using the first dielectric ink, wherein the CAM module is configured to control each of the conveyer, the first, and the second print heads; providing the first dielectric ink composition, and the second dielectric ink composition; using the CAM module, obtaining the first, substantially 2D layer of the (3D) dielectric section, the first 2D layer comprising a pattern representative of the first dielectric ink; using the first print head, forming the pattern corresponding to the first dielectric ink; curing the pattern corresponding to the first dielectric ink representation in the 2D layer of the (3D) dielectric section; obtaining the second, substantially 2D layer of the (3D) dielectric section, the second 2D layer comprising a pattern representative of the second dielectric ink; using the second print head, forming the pattern corresponding to the second dielectric ink; curing the pattern corresponding to the second dielectric ink; removing the substrate.

In another exemplary implementation, provided herein is a method for fabricating a reinforced three dimensional (3D) dielectric section using inkjet printer comprising: providing an ink jet printing system comprising: a first print head, operable to dispense a first dielectric ink composition; a second print head operable to dispense a second dielectric ink composition, wherein the second dielectric ink composition has a different thermo-mechanical characteristic parameter; a conveyor, operably coupled to the first, and the second print heads configured to convey a substrate to each of the first, and the second print heads; and a computer aided manufacturing ("CAM") module, in communication with each of the first, and second print heads, the CPM further comprising: at least one processor in communication with a non-transitory storage medium, storing thereon a set of executable instructions configured, when executed to cause the CPM to: receive a 3D visualization file representing the (3D) dielectric section; and generate a file that represents a first, substantially 2D layer for printing the reinforced (3D) dielectric section using the first dielectric ink, the file comprising a pattern corresponding to the first ink composition for printing in the first layer, and generate a file that represents a pattern for printing the second ink composition in the same first, substantially 2D layer for printing, the first and second patterns are configured to form an array of cylindrical rods of the second dielectric ink composition within a matrix of the first dielectric ink composition, wherein the CAM module is configured to control each of the conveyer, the first, and the second print heads; providing the first dielectric ink composition, and the second dielectric ink composition; using the CAM module, obtaining the first, substantially 2D layer of the (3D) dielectric section, the first 2D layer comprising a pattern representative of the first dielectric ink; using the first print head, forming the pattern corresponding to the first dielectric ink; curing the pattern corresponding to the first dielectric ink representation in the 2D layer of the (3D) dielectric section; using the second print head, forming the pattern corresponding to the second dielectric ink; curing the pattern corresponding to the second dielectric ink; removing the substrate.

In yet another exemplary implementation, provided herein is a computerized method of fabricating a reinforced three dimensional (3D) dielectric section of an additively manufactured electronics (AME) using inkjet printer, the method comprising: providing an ink jet printing system comprising: a first print head, operable to dispense a first dielectric ink composition; a second print head, operable to dispense a second dielectric ink composition, wherein the second dielectric ink composition has a different thermo-mechanical characteristic parameter than the first dielectric ink composition; a conveyor, coupled to the first, and the second print heads operable to convey a substrate to each of the first, and the second print heads; and a computer aided manufacturing ("CAM") module including a central processing module (CPM), in communication with at least the conveyor and each of the first, and second print heads, the CPM further comprising at least one processor in communication with a non-transitory processor-readable storage medium storing thereon a set of executable instructions that, when executed by the at least one processor cause the CPM to control the ink-jet printing system, by carrying out steps that comprise: receiving a 3D visualization file representing the AME; and generating a file library comprising a plurality of files, each file representing a substantially 2D layer for printing the reinforced three dimensional (3D) dielectric section of the AME, and a metafile representing at least the printing order; providing the first dielectric ink composition, and the second dielectric ink composition; using the CAM module, obtaining from the library a first file representative of the first layer for printing the reinforced three dimensional (3D) dielectric section of the AME, wherein the first file comprises printing instructions for a pattern corresponding to the first dielectric ink, and printing instruction for a pattern corresponding to the second dielectric ink; using the first print head, forming the pattern corresponding to the first dielectric ink; curing the pattern corresponding to the first dielectric ink representation in the first layer; using the second print head, forming the pattern corresponding to the second dielectric ink; curing the pattern corresponding to the second dielectric ink representation in the first layer; using the CAM module, obtaining from the library, a subsequent file representative of a subsequent layer for printing the reinforced three dimensional (3D) dielectric section of the AME; the subsequent file comprising printing instructions for a pattern corresponding to the first dielectric ink, and printing instructions for a pattern corresponding to the second dielectric ink, in each subsequent layer; repeating the steps of: using the first print head, forming the pattern corresponding to the first dielectric ink, to the step of using the CAM module, obtaining from the 2D file library the subsequent, substantially 2D layer, whereupon curing of the pattern corresponding to the second ink composition in the final layer, the reinforced three dimensional (3D) dielectric section of the AME comprises at least one of: an array of a plurality of reinforced forms of the second dielectric ink composition within a continuous matrix of the first dielectric ink composition, and alternating layers of the first dielectric ink compositions and the second dielectric ink composition; and removing the substrate.

These and other features of the methods and compositions for fabricating reinforced composite components and/or articles, will become apparent from the following detailed description when read in conjunction with the figures and examples, which are exemplary, not limiting.

BRIEF DESCRIPTION OF THE FIGURES

For a better understanding of the systems, fabrication methods and compositions of the composite components having improved thermo-mechanical properties, with regard to the exemplary implementations thereof, reference is made to the accompanying examples and figures, in which.

DETAILED DESCRIPTION

Figure 1A:
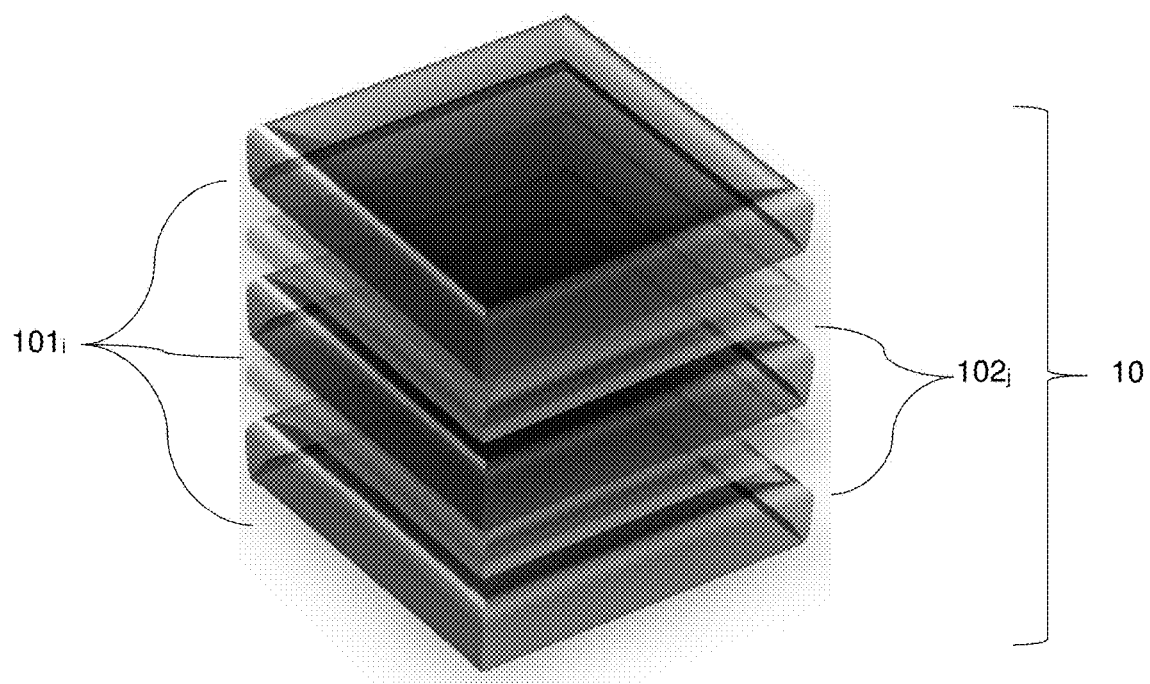
FIG. 1A, illustrates a 3D component fabricated using alternating layers of dielectric materials having different thermo-mechanical properties to fabricate a composite material, with FIG. 1B illustrating a combination of alternating basic dielectric layer with a homogeneous thermo-mechanical layer, and a rod array matrix layer, with FIG. 1C, illustrating a TMA analysis result of FIG. 1A.

Provided herein are exemplary implementations of systems, methods, and compositions for fabricating composite components having improved thermo-mechanical properties.

Three-dimensional (3D) poly-jet printers are adapted to use liquid inks that are jetted (expelled) through orifices in a nozzle array of their printing heads. Typically, commercially available 3D printers, use either polymer-based inks, ceramic based inks or metal nanoparticles based inks. Using poly-jet printing systems can overcome the precision and resolution issues that FDM printers have. In 3D printing with a poly-jet method, the inks jetted through the nozzles of the printing head must be in the liquid state.

Accordingly and in several exemplary implementations, provided herein are methods for printing a 3D component that is fabricated from two or more materials, where one of the materials acts as the main (build) matrix and the other as reinforcement material. The final printed component is referred to, in the context of the disclosure, as a composite material. In the methods disclosed, all the jetted inks are liquid before jetting and undergo curing and solidify after the jetting. The methods are configured to improve both the mechanical and/or thermal properties such as tensile strength, coefficient of thermal expansion (CTE), etc., of the final printed component. In an exemplary implementation, the improved properties are achieved by printing alternating layers of the main matrix and the reinforcement. In another exemplary implementation, the improvement is achieved by printing cylinder-like reinforcement that are embedded into the main matrix (build) material.

In another exemplary implementation, provided herein is a computerized a method for fabricating a reinforced three dimensional (3D) dielectric section of an additively manufactured electronics using inkjet printer comprising: providing an ink jet printing system comprising: a first print head, operable to dispense a first dielectric ink composition; a second print head operable to dispense a second dielectric ink composition, wherein the second dielectric ink composition has a different thermo-mechanical characteristic parameter; a conveyor, operably coupled to the first, and the second print heads configured to convey a substrate to each of the first, and the second print heads; and a computer aided manufacturing ("CAM") module including a central processing module (CPM), in communication with each of the first, and second print heads, the CPM further comprising: at least one processor in communication with a non-transitory storage medium, storing thereon a set of executable instructions configured, when executed to cause the CPM to: receive a 3D visualization file representing the (3D) dielectric section; and generate a file that represents a first, substantially 2D layer for printing the reinforced (3D) dielectric section using the first dielectric ink, and generate a file that represents a second, substantially 2D layer for printing the reinforced (3D) dielectric section using the first dielectric ink, wherein the CAM module is configured to control each of the conveyer, the first, and the second print heads; providing the first dielectric ink composition, and the second dielectric ink composition; using the CAM module, obtaining the first, substantially 2D layer of the (3D) dielectric section, the first 2D layer comprising a pattern representative of the first dielectric ink; using the first print head, forming the pattern corresponding to the first dielectric ink; curing the pattern corresponding to the first dielectric ink representation in the 2D layer of the (3D) dielectric section; obtaining the second, substantially 2D layer of the (3D) dielectric section, the second 2D layer comprising a pattern representative of the second dielectric ink; using the second print head, forming the pattern corresponding to the second dielectric ink; curing the pattern corresponding to the second dielectric ink; removing the substrate.

In yet another exemplary implementation, provided herein is a computerized method of fabricating a reinforced three dimensional (3D) dielectric section of an additively manufactured electronics (AME) using inkjet printer, the method comprising: providing an ink jet printing system comprising: a first print head, operable to dispense a first dielectric ink composition; a second print head, operable to dispense a second dielectric ink composition, wherein the second dielectric ink composition has a different thermo-mechanical characteristic parameter than the first dielectric ink composition; a conveyor, coupled to the first, and the second print heads operable to convey a substrate to each of the first, and the second print heads; and a computer aided manufacturing ("CAM") module including a central processing module (CPM), in communication with at least the conveyor and each of the first, and second print heads, the CPM further comprising at least one processor in communication with a non-transitory processor-readable storage medium storing thereon a set of executable instructions that, when executed by the at least one processor cause the CPM to control the ink-jet printing system, by carrying out steps that comprise: receiving a 3D visualization file representing the AME; and generating a file library comprising a plurality of files, each file representing a substantially 2D layer for printing the reinforced three dimensional (3D) dielectric section of the AME, and a metafile representing at least the printing order; providing the first dielectric ink composition, and the second dielectric ink composition; using the CAM module, obtaining from the library a first file representative of the first layer for printing the reinforced three dimensional (3D) dielectric section of the AME, wherein the first file comprises printing instructions for a pattern corresponding to the first dielectric ink, and printing instruction for a pattern corresponding to the second dielectric ink; using the first print head, forming the pattern corresponding to the first dielectric ink; curing the pattern corresponding to the first dielectric ink representation in the first layer; using the second print head, forming the pattern corresponding to the second dielectric ink; curing the pattern corresponding to the second dielectric ink representation in the first layer; using the CAM module, obtaining from the library, a subsequent file representative of a subsequent layer for printing the reinforced three dimensional (3D) dielectric section of the AME; the subsequent file comprising printing instructions for a pattern corresponding to the first dielectric ink, and printing instructions for a pattern corresponding to the second dielectric ink, in each subsequent layer; repeating the steps of: using the first print head, forming the pattern corresponding to the first dielectric ink, to the step of using the CAM module, obtaining from the 2D file library the subsequent, substantially 2D layer, whereupon curing of the pattern corresponding to the second ink composition in the final layer, the reinforced three dimensional (3D) dielectric section of the AME comprises at least one of: an array of a plurality of reinforced forms of the second dielectric ink composition within a continuous matrix of the first dielectric ink composition, and alternating layers of the first dielectric ink compositions and the second dielectric ink composition; and removing the substrate.

Figure 1B:
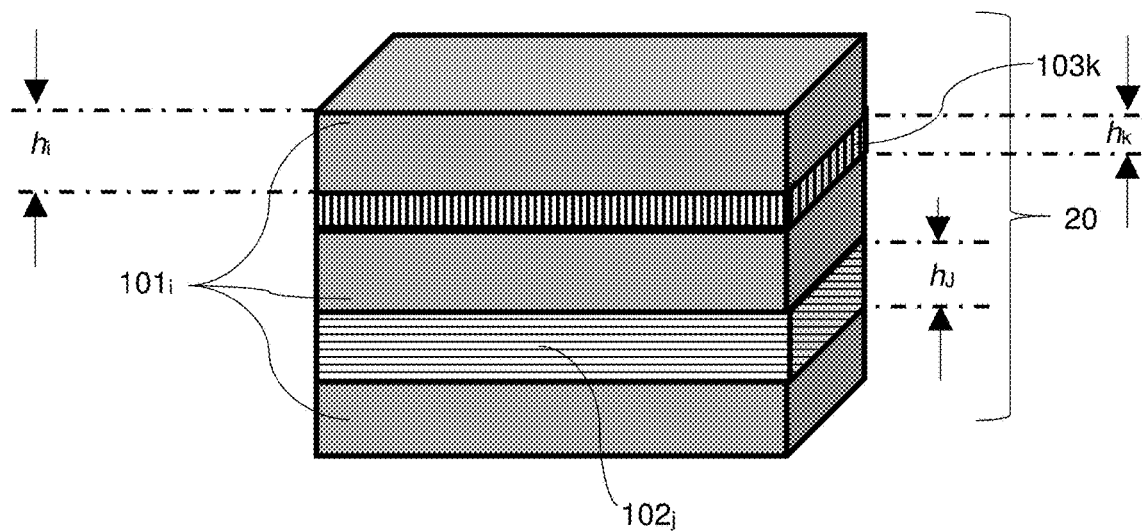

In the method, the reinforced three dimensional (3D) dielectric section of the AME can be comprised of "alternating layers" of set thickness, of two differentiated materials rather than the traditional "matrix+rods/wires reinforcement" (e.g., FR-4). The shape of the layers is configured to be printed according to the final 3D shape (obtained from the 3D file, which is parsed to 2D bitmaps or rasters for printing), of the printed component or portion thereof. The layers' thickness and the ratio (e.g., between the reinforcement and build matrix) layers of the two materials should be sized and configured according to the 3D shape of the printed component. For example, if the main purpose of using the composite material is to decrease the CTE of the printed component, thinner layers of a material with a lower CTE (after curing) should be incorporated, as can be seen in FIGS. 1A-1B.

To achieve the printing of the full 3D component, the set of executable instruction is further configured, when executed to cause the CPM (and/or at least one processor in communication with the CPM), to generate a library of files with subsequent layers, each layer comprising a pattern representative of at least one of: the first dielectric ink, and the second dielectric ink, whereby the layers configured to be printed in an alternate order between the first and the second dielectric inks—an order that can be determined by the metafile for each layer file in the library. Moreover, the pattern for each dielectric ink composition, may be the same or different and both patterns (in alternating layer configuration) can be treated as a single layer file for printing the reinforced three dimensional (3D) dielectric section of the AME.

In the context of the disclosure, the term "library", refers to the collection of 2D layer files derived from the 3D visualization file, containing the information necessary to print each the pattern of the layer to be printed with the first and second dielectric ink, which is accessible and used by the CPM, which in turn, can be executed by the executable instructions embodied in the computer-readable media. The CAM includes a CPM that further comprises a processor in communication with the library; a non-transitory storage device storing a set of operational instructions for execution by the (at least one) processor; a micromechanical inkjet print head or heads in communication with the processor and with the library; and a print head (or, heads') interface circuit in communication with the 2D file library, the non-transitory storage device and the micromechanical inkjet print head or heads, the 2D file library configured to provide printer operation parameters for printing a specific layer, for example, the alternating matrix layer or the reinforcement layer and/or pattern having different thermo-mechanical properties.

Accordingly, the method for fabricating a composite material having improved, or modulated thermo-mechanical properties using AM, further comprises using the CAM module, obtaining, from the library, a generated file representing a subsequent layer (e.g., matrix layer using the first dielectric (DI) ink composition, or the reinforcement layer using the second DI composition, or both in a single layer file and their printing order), substantially 2D layer of the reinforced 3D dielectric section of the AME for printing; and repeating the steps from obtaining the subsequent layer (after the initial at least two layers, of each matrix and reinforcement layers), comprising the patter representative of the first dielectric ink composition, to the step of curing the subsequent layer comprising the pattern representative of the second dielectric ink composition.

The thermo-mechanical characteristic parameter sought to be improved, or modulated after the step(s) of curing the alternating layer(s), or the embedded form arrays (e.g., rods, hexagons, etc.) in the build matrix (again, after curing, that may be the under the same or different conditions), using the methods disclosed herein, is at least one of: coefficient of thermal expansion ($\alpha$) [referring to the fractional increase in length or volume per unit rise in temperature], tensile strength [in other words, the cured component proportional limit, or the maximum stress up to which the stress and strain remain proportional and beyond which, any applied strain will not result in elastic response], Young's Modulus (E), Glass Transition Temperature ($T_g$) [referring to the onset temperature of critical polymer chain length's cooperative translational motion once interstitial free volume becomes large enough to accommodate the translating chain length, due to the increase in temperature], brittle-ductile transition temperature ($T_\beta$) [referring to the temperature-related fracture behavior of the cured 3D composite component], and [$T_\beta/T_g$] ratio, Poisson's Ratio (referring to the ratio of the lateral contraction (or compression) and longitudinal extension or contraction) each as measured on the cured layer and/or the reinforced 3D dielectric section of the AME.

In another exemplary implementation, the thermo-mechanical characteristic parameter sought to be improved or modulated, using the methods, systems and compositions disclosed herein, is the dielectric breakdown strength. The term "dielectric breakdown" (DEB) refers in an exemplary implementation, to a voltage induced insulator-conductor transition in an electrically insulating material resulting from a current flow through such an electrically insulating material, which is usually observed as an electrical arc across the electrodes that causes a substantial decrease in resistance. One explanation for this phenomenon assumes atoms in insulating materials have very tightly-bound electrons, resisting free electron flow very well. However, insulators cannot resist indefinite amounts of voltage. Furthermore, unlike circumstances involving conductors where current is in a linear proportion to applied voltage, current flowing through an insulator is primarily nonlinear: for voltages below a certain threshold level, virtually no electric charges will flow, but if the voltage exceeds that threshold, there will be a rush of current. Once the current is forced through an insulating material, breakdown of that material's molecular structure has ostensibly occurred. There are two known kinds of electric breakdown; namely thermal and electrical breakdown.

Thermal breakdown can be caused by excessive heating of the DI component by the electric current which causes, at a certain voltage, the polymer to melt or burn, while Electrical breakdown is usually caused by impact ionization but it can also be the result of tunneling of charge carriers from the electrode and from the valence band to the conducting band. The tunnel effect happens mainly in thin layers (p-n junctions). Using the systems, methods and compositions disclosed herein, it is possible to increase the tolerance of the composite material to high-frequency current fluctuations through the composite 3D component.

For example, using first DI composition comprising for example, Poly(methyl methacrylate) with a dielectric constant (ε) of 2.8 (at 1 MHz) as the build material, and alternating layers and/or forming an array of a plurality of embedded objects with a second DI composition, comprising for example—Poly(tetrafluoroethylene) (PTFE) having ε of 2.0, allow the increase (i.e., improvement or modulation) of the dielectric strength (in other words, the DEB threshold), from between about 100 kV/cm and about 300 kV/cm, to between about 400 kV/cm and about 650 kV/cm.

The thickness of the reinforcement layer fabricated with the second DI composition, can vary between about 7 μm, and about 120 μm, for example between about 15 μm and about 100 μm, or between about 25 μm and about 75 μm. Likewise, the thickness of the matrix (build) material can be sized and configured to vary between 2-50 μm, or between about 5 μm and about 40 μm, for example, between about 10 μm and about 35 μm, or between about 15 μm and about 25 μm. In addition, the thickness ratio between the reinforcement material layer and the matrix (build) material can be sized and configured to vary between 1:2 to 1:5.

In an exemplary implementation, the composite 3D component can be comprised of matrix (build layer interspersed with various types of fortification layers, for example, a support layer comprised of a predetermined layer thickness fabricated using the second DI composition in one interspersed layer, while, in another fortification layer, the fortified layer is comprised of both first DI composition, and second DI composition (see e.g., 20, FIG. 1B). Accordingly, the set of executable instructions is further configured, when executed to cause the CPM to: generate a file that represents a first, substantially 2D embedded object form (e.g., rods, pegs, spheres, elongated polygon rods, honeycomb walls and the like) layer for printing the reinforced (3D) dielectric section using the first dielectric ink, the file comprising a pattern corresponding to the first ink composition for printing in the first layer; and a pattern for printing corresponding to the second ink composition in the same, substantially 2D rod-matrix layer for printing, the first and second patterns are configured to form an array of a plurality of object forms of the second dielectric ink composition substantially embedded within a substantially continuous matrix of the first (build) dielectric ink composition (see e.g., FIG. 2A, 2B). Thereafter, using the first print head, forming the pattern corresponding to the first dielectric ink; curing the pattern corresponding to the first dielectric ink representation in the layer of the (3D) dielectric section; then, either sequentially or simultaneously, obtaining the file representing the pattern representative of, and corresponding to the second dielectric ink; using the second print head, forming the (array) pattern representative of and corresponding to the second dielectric ink; and curing the pattern of the second dielectric ink, thereby forming at least a portion of the array of plurality of object forms fabricated from the second DI composition (with different thermo-mechanical properties) embedded in the matrix fabricated from the first DI composition.

Similar to the alternating layer example, here too, the set of executable instruction is further configured, when executed to cause the CPM or at least one processor in communication with the CPM, to generate a library of files with subsequent layers, each layer comprising a pattern representative of and corresponding to the first dielectric ink composition, and a pattern representative of and corresponding to the second dielectric ink composition, the layers, once all the library files are printed and cured, form the array of the plurality of object forms of the second dielectric ink composition within the matrix of the first dielectric ink composition, such that, when all layers are printed, the fortifying section of composite object forms, embedded within the (build) matrix is printed to the predetermined thickness adapted to provide the reinforced 3D dielectric section of the AME with the improved and/or modulated thermo-mechanical properties desired. Accordingly and in another exemplary implementation, once the library is compiled (in other words, brought in a format to be directly executable by the CPM), and using the CAM module, obtaining the generated file(s) representing the subsequent, substantially 2D layer of the reinforced 3D dielectric section of the AME for printing; and repeating the steps of printing the subsequent bi-layer(s), and/or the object forms, from forming the pattern corresponding to the first DI of the (build) matrix, to the step of curing the pattern representative of and corresponding to the second DI composition corresponding to the alternate layer and/or array of object forms in that same subsequent layer and any layer following to the completion of the desired thickness or the completion of the reinforced 3D dielectric section of the AME.

Figure 3:
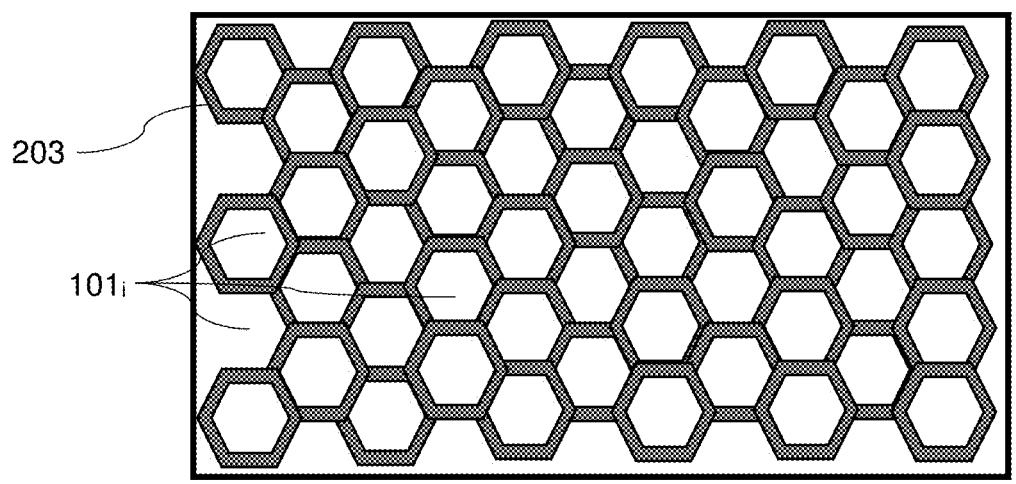
FIG. 3, showing an exemplary implementation of a honeycomb configuration fabricated using the systems, methods and compositions disclosed.

In an exemplary implementation, The whole 3D composite component can be fabricated by embedding a rod array composed of the second DI composition within the build matrix fabricated using the first DI composition, or additionally or alternatively, a pattern of the second DI composition dispersed within the first DI composition as illustrated schematically in FIG. 3. Thus, and in an exemplary implementation, provided herein is a method of fabricating a reinforced three dimensional (3D) dielectric section of an additively manufactured electronics (AME) using inkjet printer, the method comprising: providing an ink jet printing system comprising: a first print head, operable to dispense a first dielectric ink composition; a second print head, operable to dispense a second dielectric ink composition, wherein the second dielectric ink composition has a different thermo-mechanical characteristic parameter than the first dielectric ink composition; a conveyor, coupled to the first, and the second print heads operable to convey a substrate to each of the first, and the second print heads; and a computer aided manufacturing ("CAM") module including a central processing module (CPM), in communication with at least the conveyor and each of the first, and second print heads, the CPM further comprising at least one processor in communication with a non-transitory processor-readable storage medium storing thereon a set of executable instructions that, when executed by the at least one processor cause the CPM to control the ink-jet printing system, by carrying out steps that comprise: receiving a 3D visualization file representing the AME; and generating a file library comprising a plurality of files, each file representing a substantially 2D layer for printing the reinforced three dimensional (3D) dielectric section of the AME, and a metafile representing at least the printing order; providing the first dielectric ink composition, and the second dielectric ink composition; using the CAM module, obtaining from the library a first file representative of the first layer for printing the reinforced three dimensional (3D) dielectric section of the AME, wherein the first file comprises printing instructions for a pattern corresponding to the first dielectric ink, and printing instruction for a pattern corresponding to the second dielectric ink; using the first print head, forming the pattern corresponding to the first dielectric ink; curing the pattern corresponding to the first dielectric ink representation in the first layer; using the second print head, forming the pattern corresponding to the second dielectric ink; curing the pattern corresponding to the second dielectric ink representation in the first layer; using the CAM module, obtaining from the library, a subsequent file representative of a subsequent layer for printing the reinforced three dimensional (3D) dielectric section of the AME; the subsequent file comprising printing instructions for a pattern corresponding to the first dielectric ink, and printing instructions for a pattern corresponding to the second dielectric ink, in each subsequent layer; repeating the steps of: using the first print head, forming the pattern corresponding to the first dielectric ink, to the step of using the CAM module, obtaining from the 2D file library the subsequent, substantially 2D layer, whereupon curing of the pattern corresponding to the second ink composition in the final layer, the reinforced three dimensional (3D) dielectric section of the AME comprises: at least one of: an array of a plurality of reinforced forms of the second dielectric ink composition within a continuous matrix of the first dielectric ink composition, and alternating layers of the first dielectric ink compositions and the second dielectric ink composition; and removing the substrate.

Similar to the alternating layers reinforcement method exemplary implementations disclosed, the set of executable instruction is further configured, when executed, to cause the CPM, or at least one processor in communication with the CPM, to generate a library of files with subsequent layers (which can be stored locally or remotely), each layer comprising a pattern representative of and corresponding to the first dielectric ink, and the second dielectric ink, the subsequent layers configured to form the array of cylindrical rods (see e.g., FIG. 2B) and/or polygons (see e.g., FIG. 3) of the second dielectric ink composition within the matrix of the first dielectric ink composition. Here too, the method further comprises using the CAM module, obtaining the generated file representing the subsequent, substantially 2D layer of the reinforced 3D dielectric section for printing; and repeating the method steps to the completion of at least one of the reinforcing layer for example, layer $103_k$(FIG. 1B), and the whole 3D component or portion thereof (see e.g. 30, FIG. 2A).

In an exemplary implementation, the total volume of the cylindrical rods' array, and/or the polygonal pattern formed by the second dielectric ink composition in the (build) matrix formed by the first dielectric ink composition is between about 10% (v/v) and about 30% (v/v), for example, between 12% (v/v) and about 28% (v/v), or between about 15% (v/v) and about 24% (v/v) of the whole 3D dielectric component or section (e.g., portion) thereof. When the reinforced pattern fabricated using the second DI composition in the methods disclosed herein is the rod-array, then the diameter of each cylindrical rod is configured to form a rod sized to have a volume of between about 0.1% (v/v) and about 1.0% (v/v) of the total matrix volume formed of the first dielectric ink composition. Conversely, when the reinforced pattern fabricated using the second DI composition in the methods disclosed herein is the polygonal network (see e.g., 203, FIG. 3), the total volume relative to the whole 3D DI composite component, section, or portion thereof is configured to be between about 10% (v/v) and about 30% (v/v), for example, between 12% (v/v) and about 28% (v/v), or between about 15% (v/v) and about 24% (v/v).

Furthermore, here too, alternating layers of the second DI composition can be incorporated in the 3D DI component, section, or portion thereof, in addition to the rod-array or polygonal network formed by the second DI composition having different thermo-mechanical characteristic parameters, whereby the set of executable instructions can further be configured, when executed to cause the CPM or at least one processor in communication with the CPM to: move the first, and second inkjet heads relative to the substrate generate a file that represents a first, substantially 2D alternating layer for printing the reinforced (3D) dielectric section using the first dielectric ink; and moving the first, and second inkjet heads relative to the substrate generate a file that represents a second, substantially 2D alternating layer for printing the reinforced (3D) dielectric section using the first dielectric ink. Thereafter, obtaining the file of the subsequent layer representing the pattern of the first DI composition and using the first print head, forming the pattern corresponding to the first dielectric ink; curing the pattern corresponding to the first dielectric ink representation in the 2D rod-matrix layer, and/or polygonal network of the (3D) dielectric section; obtaining the file representing the layer representative of and corresponding to the second dielectric ink; using the second print head, forming the layer corresponding to the second dielectric ink; and curing the pattern corresponding to the second dielectric ink.

In an exemplary implementation, the matrix (build) material, or the first DI composition can be any curable organic, ceramic, organo-ceramic material and the reinforcement can also be any curable organic, ceramic or organo-ceramic that can reduce the CTE (or having properties that can improve thermal and/or mechanical properties of the main material). The final product is a printed composite part with lower CTE when compared to a printed part with the same shape, but without the addition of the reinforcement.

For example, the first DI composition can be a branched resin whereby thermo-mechanical properties can be controlled by the degree of branching, backbone length between branches, cross link density and the like. For example, first dielectric ink composition can comprise polyester (PES), polyethylene (PE), polyvinyl alcohol (PVOH), poly(vinylacetate) (PVA), poly-methyl methacrylate (PMMA), Poly (vinylpirrolidone), a multi-functional acrylate, or a combination comprising a mixture, a monomer, an oligomer, and a copolymer of one or more of the foregoing.

As such, the multi-functional acrylate used to form the first and/or second DI composition used in the methods disclosed herein, can be at least one of a monomer, oligomer, polymer, and copolymer of: 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl)isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate or a multifunctional acrylate composition comprising one or more of the foregoing.

Other matrix (build materials) can be used and comprise, for example vinylbenzyl compound resin, a polyolefin compound, a maleimide resin, urethane resin, urethane-modified polyester resin, or a combination thereof. For example, the vinylbenzyl compound resin is vinylbenzyl etherified-bicyclopentadiene phenol resin; the polyolefin compound is at least one of styrene-butadiene-divinylbenzene copolymer, hydrogenated styrene-butadiene-divinylbenzene copolymer, styrene-butadiene-maleic anhydride copolymer, polybutadiene-urethane-methyl methacrylate copolymer, urethane-methyl methacrylate copolymer, styrene-butadiene copolymer, polybutadiene homopolymer, styrene-isoprene-styrene copolymer, maleinized styrene-butadiene copolymer, methylstyrene copolymer, petroleum resin and cyclic olefin copolymer; and the maleimide resin is at least one of 4,4'-bismaleimidodiphenyl methane, phenylmethane maleimide oligomer, N,N'-m-phenylene bismaleimide, bisphenol A diphenyl ether bismaleimide, 3,3'-dimethyl-5,5'-diethyl-4,4'-diphenylmethane bismaleimide, N,N'-(4-methyl-1,3-phenylene) bismaleimide, 1,6-bismaleimido-(2,2,4-trimethyl) hexane, 2,3-dimethylphenylmaleimide, 2,6-dimethylphenylmaleimide, N-phenylmaleimide and the prepolymer of the abovementioned compound.

Here too, thermo-mechanical properties, such as, for example one of: coefficient of thermal expansion ($\alpha$), tensile strength, Young's Modulus (E), Glass Transition Temperature ($T_g$), and the brittle-ductile transition temperature ($T_\beta$), and [$T_\beta/T_g$] ratio, each as measured on the cured layer, can be adapted between the first and second DI composition by controlling a plurality of parameters, for example, one of: the type of monomer used, degree of polymerization, cross-link density, fractional concentration of the monomer, oligomer and/or polymer and their combination in the composition, and the like.

Similarly, the second DI composition having different thermo-mechanical properties are characteristic parameters, can be a composition comprising, for example, one of organically modified, silicate-based ceramic (ORMODS) co-monomers, having a ceramic constituent. When these constituents are used, the ceramic constituents comprise monomers, and/or oligomers of: Poly(tetrafluoroethylene), tetraethyl orthosilicate, tetramethyl ortosilicate, tetraisopropyltitanate, trimethoxysilane (TMOS), triethoxysilane, trimethyethoxysilane, phenyltriethoxysilane, phenylmethyldiethoxy silane, methyldiethoxysilane, vinylmethyldiethoxysilane, polydimethoxysilane, polydiethoxysilane, Vinylmethoxysiloxan, polysilazanes, titanium isopropoxide, aluminum isopropoxide, zirconium propoxide, triethyl borate, trimethoxyboroxine diethoxysiloxaneethyltitanate, titanium diisopropoxide bis(acetylacetonate), silanol poss, aluminium tri-sec-butoxide, triisobutylaluminium, aluminium acetylacetonate, 1,3,5,7,9-pentamethylcyclo pentasiloxane, poly(dibutyltitanate) oligomers of siloxane, and oligomers of Al—O—Al, oligomers of Ti—O—Ti, oligomers of Zn—O—Zn, or a composition comprising the foregoing.

Photoinitiators (PI) can be used with the acrylates described herein and be incorporated in the at least one of the first and second DI compositions disclosed herein, and can be, for example radical PIs. These radical PIs can be, for example one of: Irgacure® 500 from CIBA SPECIALTY CHEMICAL and Darocur® 1173, Irgacure® 819, Irgacure® 184, TPO-L (ethyl(2,4,6, trimethyl benzoil) phenyl phosphinate) benzophenone and acetophenone compounds and the like. For example, the radical photoinitiator can be cationic photo-initiator, such as mixed triarylsulfonium hexafluoroantimonate salts. Another example of the free radical photoinitiator used, is at least one of: be 2-ispropylthioxanthone (ITX), 2,4-Diethylthioxanthone (DETX), benzophenone, 4-methylbenzophenone, ethyl-4-dimethylaminobenzoate (EDAB), and 2,2-Dimethoxy-2-phenylacetophenone. In an exemplary implementation, two or more PI's are used, for example, ITX and EDAB, or in another example, EDAB, ITX and DETX.

Furthermore, the methods of forming the 3D reinforced composite components, their sections and/or portions, which is described herein can further comprise a step of providing a peelable, or removable substrate, prior to the step of using the first print head, and/or the second print head. The term "peelable" refers in an exemplary implementation to materials that can be removably applied to and adhere to surfaces such as the surface created by the method, compositions and systems for forming 3D reinforced composite components, their sections and/or portions, described herein and can be subsequently removed from that surface by force. Peelable films according to the compositions and methods of this invention can be adhesively and removably applied to a chuck disposed on the printer's conveyor belt and, by virtue of being forcibly removed, expose a layer of the 3D reinforced composite components, their sections and/or portions.

The method of forming the 3D reinforced composite components, their sections and/or portions, can, as described above, comprise the step of providing a substrate (e.g., a peelable film). The print head (and derivatives thereof, are to be understood to refer to any device or technique that deposits, transfers or creates material on a surface in a controlled manner) depositing the resin and/or second dielectric ink can be configured to provide the ink droplet(s) upon demand, in other words, as a function of various preselected process parameters such as conveyor speed, desired conductive layer thickness, layer type, layer color and the like. The removable or peelable substrate can also be a relatively rigid material, for example, glass or crystal (e.g., sapphire). Additionally, or alternatively, the peelable substrate may be a flexible (e.g., rollable) substrate (or film) to allow for an easy peeling of the substrate from the 3D reinforced composite components, their sections and/or portions, for example, poly(ethylenenaphtalate) (PEN), polyimide (e.g. KAPTONE® by DuPont), silicon polymers, poly(ethyleneterphtalate) (PET), poly(tetrafluoroethylene) (PTFE) films etc. Moreover, the substrate can be, for example a ceramic powder.

Suitable surfactants to be used in the first and/or second dielectric ink compositions disclosed herein are, for example, anionic surfactants, such as from $C_8$ to $C_{12}$ alkylbenzene sulfonates, from $C_{12}$ to $C_{16}$ alkanesulfonates, from $C_{12}$ to $C_{16}$ alkyl sulfates, from $C_{12}$ to $C_{16}$ alkyl sulfosuccinates and from $C_{12}$ to $C_{16}$ sulfated ethoxylated alkanols and nonionic surfactants such as from $C_6$ to $C_{12}$ alkylphenol ethoxylates, from $C_{12}$ to $C_{20}$ alkanol alkoxylates, and block copolymers of ethylene oxide and propylene oxide.

In an exemplary implementation, the printing system used in the methods and systems for fabricating 3D reinforced composite components, their sections and/or portions, can further comprise yet an additional functional print heads operable to dispense support ink composition, or second dielectric ink composition(s). Using the print head having support ink composition, or second dielectric ink composition, the method can further comprise providing the additional print head having support ink composition, or second dielectric ink composition; either subsequent, sequentially or simultaneously to the step of using the first print head, the second print head, or any other functional print head (and any permutation thereof), using the print head having support ink composition, or second dielectric ink composition, forming a predetermined pattern corresponding to the additional support or conductive patterns' representation generated by the CAM module from the 3D visualization file and represented as a pattern in the, substantially 2D layer(s) of the 3D reinforced composite components, their sections and/or portions, for printing.

The predetermined pattern corresponding to either the support ink composition, or second dielectric ink composition, pattern representation(s) can then be further treated (e.g., cured, cooled, crosslinked and the like), to functionalize the pattern. The process of depositing the support and/or second dielectric ink composition(s) can be repeated thereafter for every sequential layer as needed.

The term "forming" (and its variants "formed", etc.) refers in an exemplary implementation to pumping, injecting, pouring, releasing, displacing, spotting, circulating, or otherwise placing a fluid or material (e.g., the second dielectric ink) in contact with another material (e.g., the substrate, the resin or another layer) using any suitable manner known in the art.

In the context of the disclosure, the term "curing" refers to the process by which the cross-linking or curing agent such as photopolymerization initiators react with the cross-linkable functional groups to form the cross-linked network characteristic of a cured DI compositions. The cured DI compositions as employed herein is, in certain exemplary implementations, a non-deformable solid exhibiting limited or no solubility in conventional solvents. "When cured", as used herein with reference to the DI compositions as a basis for weight fractions of, for example, fillers, means that portion of the thermoset resin composition remaining in solid form after curing, which excludes solvents, volatiles, and volatile reaction components that may be generated during curing. Reaction products are only generated during curing, and not after, since any reaction will have been completed (termination reactions) when curing is done. Curing is carried out in certain implementations, by exposing the various DI composition patterns to actinic radiation in a predetermined wavelength, such as between about 190 nm and about 390 nm for a predetermined time, for example between about 2 minutes and about 2 hours, depending on the DI compositions and the thermos-mechanical parameters sought to be improved and/or modulated.

Likewise, other functional "heads" may be located before, between or after the dielectric/resinous print head and/or the conductive (metal containing) print head. These may include a source of electromagnetic (e.g., actinic) radiation configured to emit electromagnetic radiation at a predetermined wavelength ($\lambda$), for example, between 190 nm and about 400 nm, e.g. 365 nm which in an exemplary implementation, can be used to accelerate and/or modulate and/or facilitate curing of a photopolymerizable resin that can be used in conjunction the second dielectric ink. Other functional heads can be heating elements, additional printing heads with various inks (e.g., pre-soldering connective ink, label printing of various components for example capacitors, transistors and the like) and a combination of the foregoing.

As indicated, the systems used to implement the methods for fabricating 3D reinforced composite components, their sections and/or portions, can have another conductive ink print head, which ink may contain various metals. For example, the second dielectric ink composition(s) used in the systems, and methods disclosed can comprise, for example: a Silver (Ag) nanoparticles, Copper or Gold. Likewise, other metals (e.g., Al) or metal precursors can also be used and the examples provided should not be considered as limiting.

Other similar functional steps (and therefore means for affecting these steps) may be taken before or after each of the first and/or second DI/resinous ink composition deposit and curing, and/or second dielectric ink deposit and sintering, and/or support ink composition deposit and curing. These steps may include (but not limited to): a heating step (affected by a heating element, or hot air); photocuring, or exposure to any other appropriate actininc radiation source (using e.g., a UV light source); drying (e.g., using vacuum region, and heating element); (reactive) plasma deposition (e.g., using pressurized plasma gun and a plasma beam controller); cross linking such as {4-[(2-hydroxy tetradecyl)-oxyl]-phenyl}-phenyl iodonium hexafluoro antimonate to the DI/resin polymer solutions prior to coating or used as dispersant with the metal precursor or nanoparticles); annealing, or facilitating redox reactions.

In an exemplary implementation, formulating the first and/or second DI composition, take into account the requirements, if any, imposed by the deposition tool (e.g., the print head(s)—in terms of viscosity and surface tension of the composition) and the deposition surface characteristics (e.g., hydrophilic or hydrophobic, and the interfacial energy of the peelable or removable substrate or the support material used). Using for example, ink-jet printing with a piezo head, the viscosity of the first DI composition, and/or the second DI composition having different thermo-mechanical characteristic parameters, (measured between 40° C. and 55° C.) can be, for example, not lower than about 5 cP, e.g., not lower than about 8 cP, or not lower than about 10 cP, and not higher than about 30 cP, e.g., not higher than about 20 cP, or not higher than about 17 cP. Likewise, the first DI composition, and/or the second DI composition having different thermo-mechanical characteristic parameters, can be adapted to have a dynamic surface tension (referring to a surface tension when an ink droplet is formed at the printhead nozzle array's aperture) of between about 25 mN/m and about 35 mN/m, for example between about 29 mN/m and about 31 mN/m measured by maximum bubble pressure tensiometry at a surface age of 50 ms and at 25° C. The dynamic surface tension can be formulated to provide a contact angle with the peelable substrate, the support material, the resin layer(s), or their combination, that is lower than 85°.

In an exemplary implementation, the term "chuck" is intended to mean a mechanism for supporting, holding, or retaining the substrate or a workpiece. The chuck may include one or more pieces. In one exemplary implementation, the chuck may include a combination of a stage and an insert, a platform, be jacketed or otherwise be configured for heating and/or cooling and have another similar component, or any combination thereof.

In an exemplary implementation, the ink-jet ink compositions and methods allowing for a continuous or semi-continuous ink-jet printing of a 3D reinforced composite components, their sections and/or portions, can be patterned by expelling droplets of the liquid ink provided herein from an orifice one-at-a-time, as the print-head (or the substrate) is maneuvered, for example in two (X-Y) (it should be understood that the print head can also move in the Z axis) dimensions at a predetermined distance above the removable substrate or any subsequent layer. The height of the print head can be changed with the number of layers, maintaining for example a fixed distance. Each droplet can be configured to take a predetermined trajectory to the substrate on command by, for example a pressure impulse, via a deformable piezo-crystal in an exemplary implementation, from within a well operably coupled to the orifice. The printing of the first inkjet second dielectric ink can be additive and can accommodate a greater number of layers. The ink-jet print heads provided used in the methods described herein can provide a minimum layer film thickness equal to or less than about 3 μm-10,000 μm The conveyor maneuvering among the various print heads used in the methods described and implementable in the systems described, can be configured to move at a velocity of between about 5 mm/sec and about 1000 mm/sec. The velocity of the e.g., the chuck can depend, for example, on: the desired throughput, the number of print heads used in the process, the number and thickness of layers of the first DI composition, and/or the second DI composition having different thermo-mechanical characteristic parameters, their respective curing time, the evaporation rate of any ink solvents, the distance between the print head(s) dispensing the first DI composition, and/or the second DI composition having different thermo-mechanical characteristic parameters, and the like or a combination of factors comprising one or more of the foregoing.

In an exemplary implementation, the volume of each droplet of the first DI composition, and/or the second DI composition having different thermo-mechanical characteristic parameters, can each range from 0.5 to 300 picoLiter (pL), for example 1-4 pL and depended on the strength of the driving pulse and the properties of the ink. The waveform to expel a single droplet can be a 10V to about 70 V pulse, or about 16V to about 20V, and can be expelled at frequencies between about 0.1 kHz and about 18 kHz.

Initiating the backbone polymerization of the first and/or second DI compositions during curing, can be done using an initiator, for example benzoyl peroxide (BP) and other peroxide-containing compounds. The term "initiator" as used herein generally refers to a substance that initiates a chemical reaction, specifically any compound which initiates polymerization, or produces a reactive species which initiates polymerization, including, for example and without limitation, co-initiators and/or photoinitiator(s).

In addition, the terms "live monomer", "live oligomer", "live polymer" or their counterparts (co-monomer e.g.,) combination refers in an exemplary implementation to a monomer, a short group of monomers or a polymer having at least one functional group capable of forming a radical reaction (in other words, the reaction can be continued and is not otherwise terminated by an end-group). The amount of live monomer, live oligomer, or their combination the porous particulates are impregnated with will change with the desired physic-chemical characteristic of the board, film or sheet sought to be formed. The live monomer, live oligomer or a combination thereof has a number average molecular weight ($\overline{MW}_n$), in other words the average number of monomers per chain of between 1 and about 20,000, for example, $\overline{MW}_n$ between 1 and about 20,000 or $\overline{MW}_n$ of between about 250 and about 15,000, specifically between about 1,000 and about 10,000.

In an exemplary implementation, the cross-linking agent, co-monomer, co-oligomer, co-polymer or a composition comprising one or more of the foregoing and is used in the first and/or second DI compositions provided, can be a part, or configured to form a solution, emulsion, or suspension within the first and/or second DI compositions.

In another exemplary implementation, the first and/or second DI compositions comprise active components of a polymer capable of undergoing photoinitiation using the photoinitiators provided herein to facilitate curing. Such live monomer, live oligomer, live polymer or their combination can be for example, multifunctional acrylates, can be for example, at least one of: 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl)isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate, dipentaerythritol hexaacrylate, vinylbenzyl compound resin, a polyolefin compound, a maleimide resin, urethane resin, urethane-modified polyester resin, or a combination thereof. For example, the vinylbenzyl compound resin is vinylbenzyl etherified-bicyclopentadiene phenol resin; the polyolefin compound is at least one of styrene-butadiene-divinylbenzene copolymer, hydrogenated styrene-butadiene-divinylbenzene copolymer, styrene-butadiene-maleic anhydride copolymer, polybutadiene-urethane-methyl methacrylate copolymer, urethane-methyl methacrylate copolymer, styrene-butadiene copolymer, polybutadiene homopolymer, styrene-isoprene-styrene copolymer, maleinized styrene-butadiene copolymer, methylstyrene copolymer, petroleum resin and cyclic olefin copolymer; and the maleimide resin is at least one of 4,4'-bismaleimidodiphenyl methane, phenylmethane maleimide oligomer, N,N'-m-phenylene bismaleimide, bisphenol A diphenyl ether bismaleimide, 3,3'-dimethyl-5,5'-diethyl-4,4'-diphenylmethane bismaleimide, N,N'-(4-methyl-1,3-phenylene) bismaleimide, 1,6-bismaleimido-(2,2,4-trimethyl)hexane, 2,3-dimethylphenylmaleimide, 2,6-dimethylphenylmaleimide, N-phenylmaleimide and the prepolymer of the abovementioned compound.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple (remote) locations. Further, the term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads)

The CAM module can comprise: a 2D file library storing the files converted from the 3D visualization files of the 3D reinforced composite components, their sections and/or portions, at least one processor in communication with the various print heads, the conveyor, the chuck, any additional functional "heads" and the library; a non-transitory storage medium storing a set of operational instructions for execution by the at least one processor; a micromechanical inkjet print head or heads in communication with the at least one processor and with the library; and a print head (or, heads') interface circuit in communication with the 2D file library, the memory and the micromechanical inkjet print head or heads, the 2D file library configured to provide printer operation parameters specific to a functional layer; pre-processing Computer-Aided Design/Computer-Aided Manufacturing (CAD/CAM) generated information associated with the 3D 3D reinforced composite components, their sections and/or portions, to be fabricated, thereby obtaining a plurality of 2D file representing the printing layers; loading the plurality of 2D files processed in the step of pre-processing from the 3D reinforced composite components, their sections and/or portions, 3D visualization files onto the 2D file library; and using the 2D file library, instructing the at least one processor to print the predetermined layer of the 3D reinforced composite components, their sections and/or portions, in a predetermined order of the layer number and the first and second DI compositions' corresponding patterns.

The 3D visualization file representing the 3D reinforced composite components, their sections and/or portions, used for fabrication, can be, for example: an .asm, an STL, an IGES, a STEP, a Catia, a SolidWorks, a ProE, a 3D Studio, a Gerber, a Rhino file or a file comprising one or more of the foregoing; and wherein file that represents at least one, substantially 2D layer (and uploaded to the library) can be, for example, a JPEG, a GIF, a TIFF, a BMP, a PDF file, or a combination comprising one or more of the foregoing.

In certain exemplary implementations, the CAM module further comprises a computer program product for fabricating one or more 3D reinforced composite components, their sections and/or portions, and the like. The printed component can be, for example, a medical device, an electronic device, comprising both discrete conductive components and dielectric/resinous components that are each and both being printed optionally simultaneously or sequentially and continuously. The term "continuous" and its variants are intended to mean printing in a substantially unbroken process. In another exemplary implementation, continuous refers to a layer, member, or structure in which no significant breaks in the layer, member, or structure lie along its length.

For example, and as illustrated in FIG. 1A, the method can consist of "alternating layers" of set thickness of two materials distinguishable in their thermo-mechanical characteristic parameters, and not of the traditional "matrix+rods/wires reinforcement" such as, for example, FR-4. The 2D shape of the individual layers, and the 3D shape of the component can be printed according to the final 3D shape of the printed part. The layers' thickness $h_i$, $h_j$, and $h_k$, and the ratio between the layers of the two materials $101_i$, $102_j$, $103_k$, can be configured according to the 3D shape of the printed component, section, or portion thereof. This method can be demonstrated when printing a cube or a box 10. For example, if the main purpose is to decrease the CTE of printed component 10, section, or portion thereof, thinner layers $102_i$ of a material with a lower CTE can be incorporated, as can be seen in FIG. 1A. The thickness of matrix (build) material layer $101_1$ (e.g., the first DI composition) van vary between 7-120 μm and the thickness of the reinforcement material $102_j$ (e.g., the second DI composition), can vary between 2-50 Mm. For example, matrix (build) material $101_i$ can be any curable organic, ceramic, organo-ceramic material and the reinforcement material $102_j$ can also be any curable organic, ceramic or organo-ceramic that can reduce the CTE (or having properties that can improve thermal and/or mechanical properties of the matrix (build) material). The final product is a printed composite component, section, or portion thereof with lower CTE when compared to a printed component, section, or portion thereof with the same shape, but without the addition of the reinforcement.

FIG. 1B illustrates a 3D composite component 20 fabricated such that reinforcement layers $102_j$ and $103_k$ are interspersed within layers of matrix (build) layers $101_i$, however, while reinforcement layer $102_j$, is a layer fabricated from a homogeneous composition of the second DI composition, layer $103_k$ is in itself a composite layer formed by printing a rod-array, or polygonal network into the matrix (build) material $101_i$, to form the layer thickness.

Example I: Alternating Layer Method Results

To demonstrate the improvement in thermo-mechanical properties, three boxes were printed using the systems, methods and compositions disclosed. The firs box is fabricated from only the matrix (build) material $101_i$, which was not exposed to any actinic radiation during the curing process. The second box is fabricated only from matrix (build) material $101_i$ and was exposed to actinic radiation during the curing process. The third box is fabricated from alternating layers of matrix (build) material $101_i$ and organo-ceramic materials $102_j$ (composite box) and was exposed to actinic radiation during curing. The exposure to irradiation during the curing process increases the temperature of the component during the printing and can decrease thermo-mechanical properties.

Figure 1C:
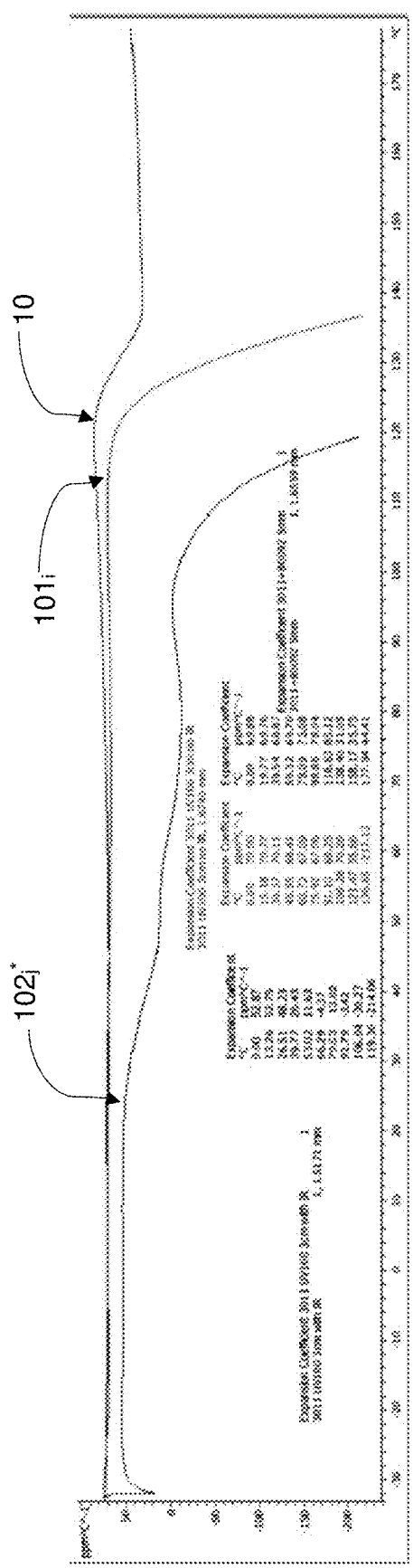
Figure 2A:
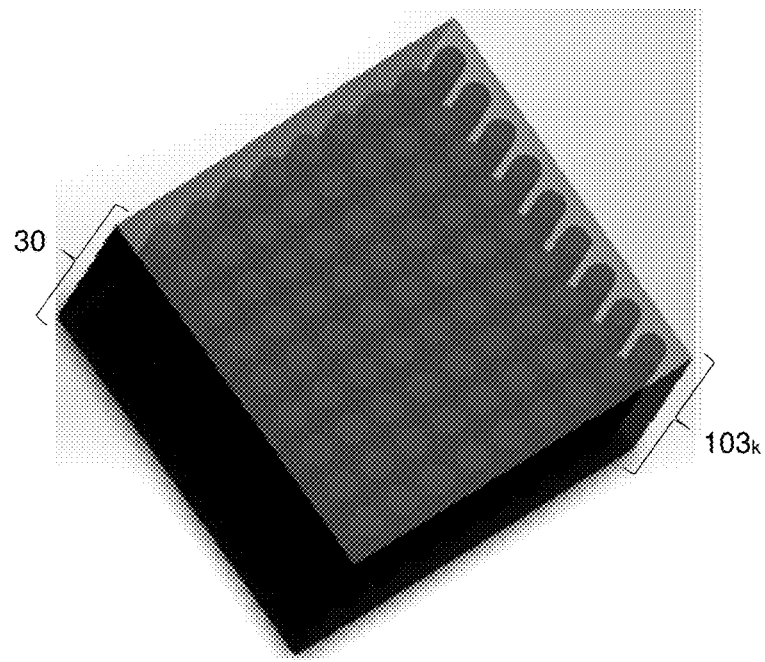
FIG. 2A, showing an exemplary implementation of a rod-array embedded in a matrix, with rod-array configuration schematic illustrated in FIG. 2B.
Figure 2B:
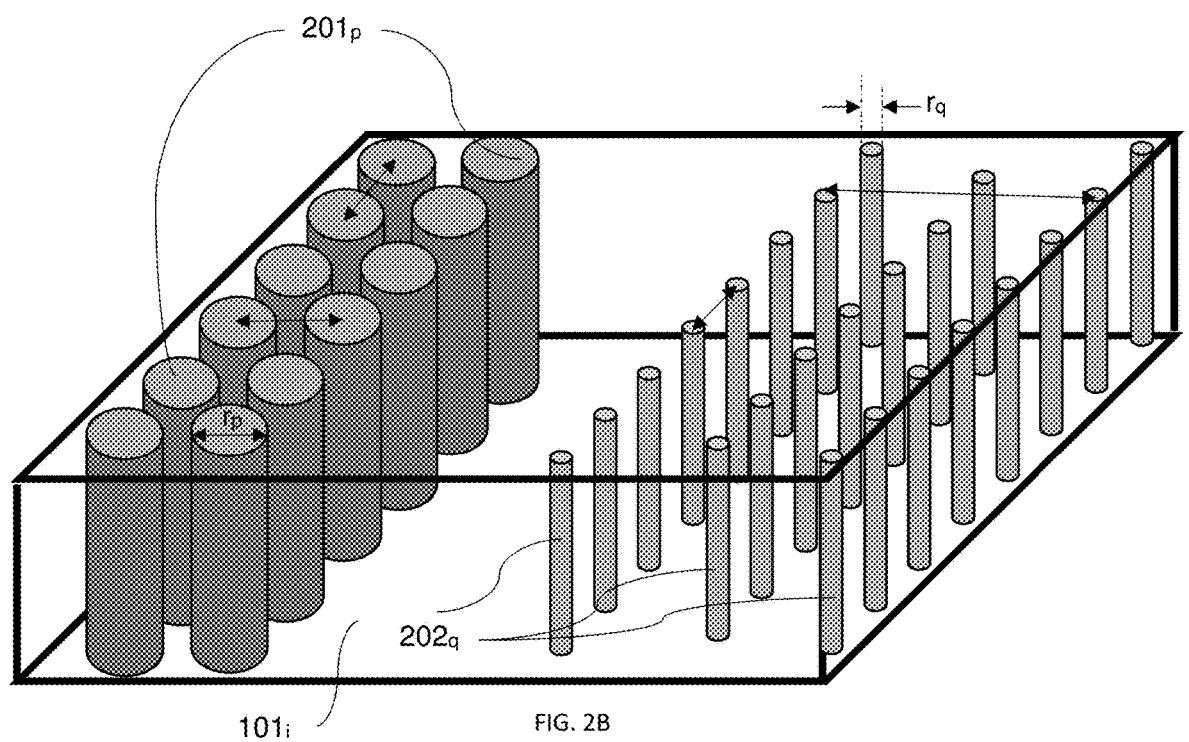

The three boxes were examined by thermo mechanical analysis (TMA) technique, with the use of Mettler Toledo equipment. The comparison of the three boxes can be seen in FIG. 1C. When not exposed to actinic radiation, the box made of matrix (build) material $101_i$ alone withstands the applied mechanical stress during the TMA test up to 115° C. and then collapses. The box that was fabricated using only matrix (build) material $102_j$ exposed to actinic radiation during the curing process, collapses much earlier—around 25° C., while composite box that was exposed to actinic radiation during the curing process can withstand the applied, temperature-dependent stress up to 125° C. As can be seen from the results, the composite box (e.g., 10) has a much better performance when compared with box fabricated using only matrix (build) material $101_i$ Turning now to FIG. 2A, 2B, illustrating 3D composite component, section, or portion thereof 30, fabricated using the systems and methods provided, whereby the reinforcement of the matrix (build) material $101_i$ is made by incorporating vertical (or horizontal and any angle in between) cylinder-like reinforcement rods $201_p$, $202_q$ with a selected length (e.g., $h_q$) and diameter $D_p$, $D_q$, as can be seen in FIG. 2B. Just like in previously discussed "alternating layers' method, the reinforcement material should have different, thermal and/or mechanical properties. For example, if a tensile strength of the support material is to be improved, vertical cylinder-like reinforcement rod-array $201_p$, $202_q$ of an organo-ceramic material made should be printed with the matrix (build) material $101_i$. The diameter $D_p$, $D_q$, of cylinders $201_p$, $202_q$, the distance between the cylinders ($R_p$, $R_{qX}$, $R_{qY}$) and their total number, should be chosen with a correspondence to the final shape of the printed part. As illustrated the number of cylinders $201_p$, $202_q$ is configured such that the total volume of the cylinders should vary between 10-30% of the total volume of the printed component, section, or portion thereof. The exact diameter of the base of the cylinders should be chosen with a correspondence to this value (10-30%). The volume of each individual cylinder is configured to be between 0.1-1% of the total volume of the printed part, with the combination of each cylinder in the array and the total volume occupied determining the final characteristic of characteristic thermo-mechanical parameters. In addition, when printing a support material as the main matrix, the reinforcement shape and quantity should not affect the efficiency of the removal method.

Turning now to FIG. 3, illustrating another exemplary implementation of fabricating the 3D composite component, section, or portion thereof, whereby, instead of rod-array of cylinders, the reinforced composite layer can comprise a polygonal network 203, forming a closed-cell matrix filled with the matrix (build) material 101*i*, forming a honeycomb structure of the reinforcement material 203 fabricated by e.g., the second DI composition. For example, the network forming the polygonal closed cells can be formed of comprising organically modified, silicate-based ceramic (OR-MODS) co-monomers, having a ceramic constituent, while the matrix (build) material can be, for example, polyester (PES), polyethylene (PE), polyvinyl alcohol (PVOH), poly (vinylacetate) (PVA), poly-methyl methacrylate (PMMA), Poly(vinylpirrolidone), a multi-functional acrylate, or a combination comprising a mixture, a monomer, an oligomer, and a copolymer of one or more of the foregoing.

The computer controlling the printing process described herein can comprise: a computer readable, non-transitory storage medium with computer readable program code embodied therewith, the computer readable program code when executed by a processor in a digital computing device causes in an exemplary implementation, a three-dimensional inkjet printing unit to perform the steps of: pre-processing Computer-Aided Design/Computer-Aided Manufacturing (CAD/CAM) generated information associated with the 3D reinforced composite components, their sections and/or portions, (in other words, the 3D visualization file representing the component) to be fabricated, thereby obtaining a plurality of 2D files (in other words, the file that represents at least one, substantially 2D layer for printing layer(s) of the component), each 2D file specific for a predetermined layer in a specific order; loading the plurality of 2D file(s) processed in the step of pre-processing onto a 2D file library; directing a stream of droplets of a conductive material from an inkjet print head of the three-dimensional inkjet printing unit at a surface of a substrate; directing a stream of droplets of a DI/resinous ink material from another inkjet print head of the three-dimensional inkjet printing unit at the surface of the substrate; alternatively or additionally directing a stream of droplets of a support ink composition from yet another inkjet print head of the three-dimensional inkjet printing unit at a surface; moving the first, and second inkjet heads relative to the substrate in an X-Y plane of the substrate on a chuck, wherein the step of moving the first, and second inkjet heads relative to the substrate in the X-Y plane of the substrate, for each of a plurality of layers is performed in a layer-by-layer fabrication of the first DI composition, and/or the second DI composition having different thermo-mechanical characteristic parameters, on the substrate.

As indicated, the methods disclosed, implementable using the systems and devices provided using the executable instructions stored on non-transitory storage medium, are computerized methods utilizing processor-readable media such as various computer programs. The computer programs (software and/or firmware), can comprise program code means for carrying out the steps of the methods described herein, as well as a computer program product comprising program code means stored on a medium that can be read by a computer, such as a hard disk, CD-ROM, DVD, USB memory stick, or a storage medium that can be accessed via a data network, such as the Internet or Intranet, when the computer program product is loaded in the matrix (build) memory of a computer and is carried out by the computer.

Thus, the terms "non-transitory storage medium" and "non-transitory computer-readable storage medium" are defined as including, but not necessarily being limited to, any media that can contain, store, or matrix (build) tain programs, information, and data. Non-transitory storage medium and non-transitory computer-readable storage medium may include any one of many physical media such as, for example, electronic, magnetic, optical, electromagnetic, or semiconductor media. More specific examples of suitable non-transitory storage medium and non-transitory computer-readable storage medium include, but are not limited to, a magnetic computer diskette such as hard drives, magnetic tape, a random access memory (RAM), a read-only memory (ROM), solid state drive (SSD), serial AT Attachment (SATA), an erasable programmable read-only memory (EPROM), a flash drive, a compact disc (CD), or a digital video disk (DVD).

In addition, the non-transitory storage medium may be located in a first computer in which the programs are executed (e.g., the 3D inkjet printer provided), and/or may be located in a second different computer which is in communication with the first computer over a network, such as the Internet. In the latter instance, the second computer may further provide program instructions to the first computer for execution. The term "memory device" can also include two or more memory devices which may reside in different locations, e.g., in different computers that are connected over a network. Accordingly, for example, the bitmap library can reside on a memory device that is remote from the CAM module coupled to the 3D inkjet printer provided, and be accessible by the 3D inkjet printer provided (for example, by a wide area network).

Unless specifically stated otherwise, as apparent from the following discussions, it is appreciated that throughout the specification discussions utilizing terms such as "processing," "obtaining", "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical structural (in other words, resin or metal/conductive) layers.

Furthermore, as used herein, the term "2D file library" refers to a given set of files that together define a single 3D reinforced composite components, their sections and/or portions, or a plurality of components, each used for a given purpose. The term can also be used to refer to a set of 2D files or any other raster graphic file format (the representation of images as a collection of pixels, generally in the form of a rectangular grid, e.g., BMP, PNG, TIFF, GIF), capable of being indexed, searched, and reassembled to provide the structural layers of a given component, whether the search is for the component, or a given specific layer.

The Computer-Aided Design/Computer-Aided Manufacturing (CAD/CAM) generated information associated with the 3D reinforced composite components, their sections and/or portions, to be fabricated used in the methods, programs and libraries for using inkjet printing based on converted CAD/CAM data packages can be, for example, IGES, DXF, DMIS, NC files, GERBER® files, EXCELLON®, STL, EPRT files, an .asm, a STEP, a Catia, a SolidWorks, a ProE, a 3D Studio, a Rhino file or a package comprising one or more of the foregoing. Additionally, attributes attached to the graphics objects transfer the metainformation needed for fabrication and can precisely define the image and the structure and color of the image (e.g., resin or metal), resulting in an efficient and effective transfer of fabrication data from design (3D visualization CAD e.g.,) to fabrication (CAM e.g.,). Accordingly and in an exemplary implementation, using pre-processing algorithm, GERBER®, EXCELLON®, DWG, DXF, STL, EPRT ASM, and the like as described herein, are converted to 2D files.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the constituent(s) includes one or more constituent). Reference throughout the specification to "one exemplary implementation", "another exemplary implementation", "an exemplary implementation", and so forth, when present, means that a component, section, or portion thereof in a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

All ranges disclosed herein are inclusive of the endpoints, and the endpoints are independently combinable with each other. Furthermore, the terms "first," "second," and the like, herein do not denote any order, quantity, or importance, but rather are used to denote one element from another.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Accordingly and in an embodiment, provided herein is a method of fabricating a reinforced three dimensional (3D) dielectric section of an additively manufactured electronics (AME) using inkjet printer, the method comprising: providing an ink jet printing system comprising: a first print head, operable to dispense a first dielectric ink composition; a second print head, operable to dispense a second dielectric ink composition, wherein the second dielectric ink composition has a different thermo-mechanical characteristic parameter than the first dielectric ink composition; a conveyor, coupled to the first, and the second print heads operable to convey a substrate to each of the first, and the second print heads; and a computer aided manufacturing ("CAM") module including a central processing module (CPM), in communication with at least the conveyor and each of the first, and second print heads, the CPM further comprising at least one processor in communication with a non-transitory processor-readable storage medium storing thereon a set of executable instructions that, when executed by the at least one processor cause the CPM to control the ink-jet printing system, by carrying out steps that comprise: receiving a 3D visualization file representing the AME; and generating a file library comprising a plurality of files, each file representing a substantially 2D layer for printing the reinforced three dimensional (3D) dielectric section of the AME, and a metafile representing at least the printing order; providing the first dielectric ink composition, and the second dielectric ink composition; using the CAM module, obtaining from the library a first file representative of the first layer for printing the reinforced three dimensional (3D) dielectric section of the AME, wherein the first file comprises printing instructions for a pattern corresponding to the first dielectric ink, and printing instruction for a pattern corresponding to the second dielectric ink; using the first print head, forming the pattern corresponding to the first dielectric ink; curing the pattern corresponding to the first dielectric ink representation in the first layer; using the second print head, forming the pattern corresponding to the second dielectric ink; curing the pattern corresponding to the second dielectric ink representation in the first layer; using the CAM module, obtaining from the library, a subsequent file representative of a subsequent layer for printing the reinforced three dimensional (3D) dielectric section of the AME, the subsequent file comprising printing instructions for a pattern corresponding to the first dielectric ink, and printing instructions for a pattern corresponding to the second dielectric ink, in each subsequent layer; repeating the steps of: using the first print head, forming the pattern corresponding to the first dielectric ink, to the step of using the CAM module, obtaining from the 2D file library the subsequent, substantially 2D layer, whereupon curing of the pattern corresponding to the second ink composition in the final layer, the reinforced three dimensional (3D) dielectric section of the AME comprises at least one of: an array of a plurality of reinforced forms of the second dielectric ink composition within a continuous matrix of the first dielectric ink composition, and alternating layers of the first dielectric ink compositions and the second dielectric ink composition; and removing the substrate, wherein (i) the thermo-mechanical characteristic parameter is at least one of: coefficient of thermal expansion ($\epsilon$), tensile strength, Young's Modulus (E), Glass Transition Temperature ($T_g$), the brittle-ductile transition temperature ($T_\beta$), and [$T_\beta/T_g$] ratio, and dielectric strength (kV/cm), each as measured on the cured layer, or section of the AME and other such reinforced components, wherein (ii) the first dielectric ink composition comprises polyester (PES), polyethylene (PE), polyvinyl alcohol (PVOH), poly(vinylacetate) (PVA), poly(methyl methacrylate) (PMMA), Poly (vinylpirrolidone), a multi-functional acrylate, or a combination comprising a mixture, a monomer, an oligomer, and a copolymer of one or more of the foregoing, (iii) the second ink composition comprising poly(tetra fluoroethylene) (PTFE), or organically modified, silicate-based ceramic (ORMODS) co-monomers, having a ceramic constituent, (iv) the ceramic constituents comprise monomers, and/or oligomers of: tetraethyl orthosilicate, tetramethyl ortosilicate, tetraisopropyltitanate, trimethoxysilane (TMOS), triethoxysilane, trimethyethoxysilane, phenyltriethoxysilane, phenylmethyldiethoxy silane, methyldiethoxysilane, vinylmethyldiethoxysilane, polydimethoxysilane, polydiethoxysilane, Vinylmethoxysiloxan, polysilazanes, titanium isopropoxide, aluminum isopropoxide, zirconium propoxide, triethyl borate, trimethoxyboroxine diethoxysiloxane-ethyltitanate, titanium diisopropoxide bis(acetylacetonate), silanol poss, aluminium tri-sec-butoxide, triisobutylaluminium, aluminium acetylacetonate, 1,3,5,7,9-pentamethylcyclo pentasiloxane, poly(dibutyltitanate) oligomers of siloxane, and oligomers of Al—O—Al, oligomers of Ti—O—Ti, oligomers of Zn—O—Zn, or a composition comprising the foregoing, wherein (v) the multi-functional acrylate is at least one of a monomer, oligomer, polymer, and copolymer of: 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl) isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate or a multifunctional acrylate composition comprising one or more of the foregoing, wherein (vi) the layer corresponding to the first dielectric ink composition in the configuration of the alternating layers of the first dielectric ink compositions and the second dielectric ink composition, is configured (e.g., by the printing process defined by the library 2D layer files, wherein a "layer" refers to a sub'layer fabricated from the first DI composition, and another sub-layer fabricated from the second DI composition, including the metafile containing the printing order and the thickness of each for example) to have a thickness of between about 2 μm and 50 μm, (vii) the layer corresponding to the second dielectric ink composition in the alternating layers of the first dielectric ink compositions and the second dielectric ink composition has a thickness of between about 7 μm and about 120 μm, wherein (viii) the ratio between the layer corresponding to the second dielectric ink composition, and the layer corresponding to the first dielectric ink composition is between 1:2 and 1:5, wherein (ix) the form object (in other words, the object having a predetermined form, fabricated from the second DI composition) in the array of the plurality of reinforced form objects of the second dielectric ink composition within the continuous matrix of (fabricated from) the first dielectric ink composition is at least one of: a rod, a peg, an elongated member having a polygonal cross section of between 3 and 359 sides, and a combination of forms comprising the foregoing, for example, (x) the reinforced form object is a cylindrical rod, wherein (xi) the total volume of all the cylindrical rods formed from the second dielectric ink composition in the matrix formed from the first dielectric ink composition is between about 10% (v of cylindrical rods/v total reinforced section) and about 30% (v/v), (xii) the diameter of each cylindrical rod is configured such that each cylindrical rod has a volume of between about 0.1% (v of cylindrical rod=$\pi r^2 h/2$/v total reinforced section (v/v)) and about 1.0% (v/v) of the total matrix volume formed of the first dielectric ink composition, wherein additionally, or alternatively, (xiii) the reinforced form object is a polygonal network formed by the second dielectric ink composition, forming a closed-cell matrix filled with the first dielectric ink composition thereby forming a honeycomb structure, and wherein (xiii) the network forming the polygonal closed cells is formed of a composition comprising organically modified, silicate-based ceramic (ORMODS) co-monomers, having a ceramic constituent, and wherein the first dielectric ink composition is polyester (PES), polyethylene (PE), polyvinyl alcohol (PVOH), poly(vinylacetate) (PVA), poly (methyl methacrylate) (PMMA), Poly(vinylpirrolidone), a multi-functional acrylate, or a combination comprising a mixture, a monomer, an oligomer, and a copolymer of one or more of the foregoing.

In another exemplary implementation, provided herein is a computerized method for fabricating a reinforced three dimensional (3D) dielectric section using inkjet printer comprising: providing an ink jet printing system comprising: a first print head, sized and configured to dispense a first dielectric ink composition; a second print head sized and configured to dispense a second dielectric ink composition, wherein the second dielectric ink composition has a different thermo-mechanical characteristic parameter; a conveyor, operably coupled to the first, and the second print heads configured to convey a substrate to each of the first, and the second print heads; and a computer aided manufacturing ("CAM") module, in communication with each of the first, and second print heads, the CPM further comprising: at least one processor in communication with a non-transitory storage medium, storing thereon a set of executable instructions configured, when executed to cause the CPM to: receive a 3D visualization file representing the (3D) dielectric section; and generate a file that represents a first, substantially 2D layer for printing the reinforced (3D) dielectric section using the first dielectric ink, and generate a file that represents a second, substantially 2D layer for printing the reinforced (3D) dielectric section using the first dielectric ink, wherein the CAM module is configured to control each of the conveyer, the first, and the second print heads; providing the first dielectric ink composition, and the second dielectric ink composition; using the CAM module, obtaining the first, substantially 2D layer of the (3D) dielectric section, the first 2D layer comprising a pattern representative of and corresponding to the first dielectric ink; using the first print head, forming the pattern corresponding to the first dielectric ink; curing the pattern corresponding to the first dielectric ink representation in the 2D layer of the (3D) dielectric section; obtaining the second, substantially 2D layer of the (3D) dielectric section, the second 2D layer comprising a pattern representative of and corresponding to the second dielectric ink; using the second print head, forming the pattern corresponding to the second dielectric ink; curing the pattern corresponding to the second dielectric ink; removing the substrate. thereby fabricating reinforced (3D) dielectric section(s) for any composite, AM fabricated component.

In yet another exemplary implementation, provided herein is a computerized method for fabricating a reinforced three dimensional (3D) dielectric section using inkjet printer comprising: providing an ink jet printing system comprising: a first print head, sized and configured to dispense a first dielectric ink composition; a second print head sized and configured to dispense a second dielectric ink composition, wherein the second dielectric ink composition has a different thermo-mechanical characteristic parameter; a conveyor, operably coupled to the first, and the second print heads configured to convey a substrate to each of the first, and the second print heads; and a computer aided manufacturing ("CAM") module, in communication with each of the first, and second print heads, the CPM further comprising: at least one processor in communication with a non-transitory storage medium, storing thereon a set of executable instructions configured, when executed to cause the CPM to: receive a 3D visualization file representing the (3D) dielectric section; and generate a file that represents a first, substantially 2D layer for printing the reinforced (3D) dielectric section using the first dielectric ink, the file comprising a pattern corresponding to the first ink composition for printing in the first layer, and generate a file that represents a pattern for printing the second ink composition in the same first, substantially 2D layer for printing, the first and second patterns are configured to form an array of cylindrical rods of the second dielectric ink composition within a matrix of the first dielectric ink composition, wherein the CAM module is configured to control each of the conveyer, the first, and the second print heads; providing the first dielectric ink composition, and the second dielectric ink composition; using the CAM module, obtaining the first, substantially 2D layer of the (3D) dielectric section, the first 2D layer comprising a pattern representative of and corresponding to the first dielectric ink; using the first print head, forming the pattern corresponding to the first dielectric ink; curing the pattern corresponding to the first dielectric ink representation in the 2D layer of the (3D) dielectric section; using the second print head, forming the pattern corresponding to the second dielectric ink; curing the pattern corresponding to the second dielectric ink; and removing the substrate Although the foregoing disclosure for 3D printing of 3D reinforced composite components, their sections and/or portions, using additive manufacturing based on converted 3D visualization CAD/CAM data packages has been described in terms of some exemplary implementations, other exemplary implementations will be apparent to those of ordinary skill in the art from the disclosure herein. Moreover, the described exemplary implementations have been presented by way of example only, and are not intended to limit the scope of the inventions. Indeed, the novel methods, programs, libraries and systems described herein may be embodied in a variety of other forms without departing from the spirit thereof. Accordingly, other combinations, omissions, substitutions and modifications will be apparent to the skilled artisan in view of the disclosure herein.

What is claimed:

1. A method of fabricating a reinforced three dimensional (3D) dielectric section of an additively manufactured electronics (AME) using inkjet printing, the method comprising:
  a. providing an ink jet printing system comprising:
     i. a first print head, operable to dispense a first dielectric ink composition;
     ii. a second print head, operable to dispense a second dielectric ink composition comprising organically modified, silicate-based ceramic (ORMODS) co-monomers, having a ceramic constituent, wherein the second dielectric ink composition has a different thermo-mechanical characteristic parameter than the first dielectric ink composition;
     iii. a conveyor, coupled to the first, and the second print heads operable to convey a substrate to each of the first, and the second print heads; and
     iv. a computer aided manufacturing ("CAM") module including a central processing module (CPM), in communication with at least the conveyor and each of the first, and second print heads, the CPM further comprising at least one processor in communication with a non-transitory processor-readable storage medium storing thereon a set of executable instructions that, when executed by the at least one processor cause the CPM to control the ink-jet printing system, by carrying out steps that comprise:
        I. receiving a 3D visualization file representing the AME; and
        II. generating a file library comprising a plurality of files, each file representing a substantially 2D layer for printing the reinforced three dimensional (3D) dielectric section of the AME, and a metafile representing at least the printing order;
  b. providing the first dielectric ink composition, and the second dielectric ink composition;
  c. using the CAM module, obtaining from the library a first file representative of the first layer for printing the reinforced three dimensional (3D) dielectric section of the AME, wherein the first file comprises printing instructions for a pattern corresponding to the first dielectric ink, and printing instruction for a pattern corresponding to the second dielectric ink;
  d. using the first print head, forming the pattern corresponding to the first dielectric ink;
  e. curing the pattern corresponding to the first dielectric ink representation in the first layer;
  f. using the second print head, forming the pattern corresponding to the second dielectric ink;
  g. curing the pattern corresponding to the second dielectric ink representation in the first layer;
  h. using the CAM module, obtaining from the library, a subsequent file representative of a subsequent layer for printing the reinforced three dimensional (3D) dielectric section of the AME, the subsequent file comprising printing instructions for a pattern corresponding to the first dielectric ink, and printing instructions for a pattern corresponding to the second dielectric ink, in each subsequent layer;
  i. repeating the steps of: using the first print head, forming the pattern corresponding to the first dielectric ink, to the step of using the CAM module, obtaining from the 2D file library the subsequent, substantially 2D layer, whereupon curing of the pattern corresponding to the second ink composition in the final layer, the reinforced three dimensional (3D) dielectric section of the AME comprises at least one of: an array of a plurality of reinforced forms of the second dielectric ink composition within a continuous matrix of the first dielectric ink composition, and alternating layers of the first dielectric ink compositions and the second dielectric ink composition; and
  j. removing the substrate.

2. The method of claim 1, wherein the thermo-mechanical characteristic parameter is at least one of: coefficient of thermal expansion ($\alpha$), tensile strength, Young's Modulus (E), Glass Transition Temperature ($T_g$), the brittle-ductile transition temperature ($T_\beta$), and [$T_\beta/T_g$] ratio, and dielectric strength, each as measured on the cured layer.

3. The method of claim 1, wherein the first dielectric ink composition comprises polyester (PES), polyethylene (PE), polyvinyl alcohol (PVOH), poly(vinylacetate) (PVA), poly (methyl methacrylate) (PMMA), Poly(vinylpirrolidone), a multi-functional acrylate, or a combination comprising a mixture of: a monomer, an oligomer, and a copolymer of one or more of the foregoing.

4. The method of claim 1, wherein the ceramic constituents comprise monomers, and/or oligomers of: tetraethyl orthosilicate, tetramethyl ortosilicate, tetraisopropyltitanate, trimethoxysilane (TMOS), triethoxysilane, trimethyethoxysilane, phenyltriethoxysilane, phenylmethyldiethoxy silane, methyldiethoxysilane, vinylmethyldiethoxysilane, polydimethoxysilane, polydiethoxysilane, Vinylmethoxysiloxan, polysilazanes, titanium isopropoxide, aluminum isopropoxide, zirconium propoxide, triethyl borate, trimethoxyboroxine diethoxysiloxane-ethyltitanate, titanium diisopropoxide bis(acetylacetonate), silanol POSS, aluminium tri-sec-butoxide, triisobutylaluminium, aluminium acetylacetonate, 1,3,5,7,9-pentamethylcyclo pentasiloxane, poly(dibutyltitanate) oligomers of siloxane, and oligomers of Al—O—Al, oligomers of Ti—O—Ti, oligomers of Zn—O—Zn, or a composition comprising the foregoing.

5. The method of claim 4, wherein the multi-functional acrylate is at least one of a monomer, oligomer, polymer, and copolymer of: 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl)isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate or a multifunctional acrylate composition comprising one or more of the foregoing.

6. The method of claim 1, wherein the layer corresponding to the first dielectric ink composition in the alternating layers of the first dielectric ink compositions and the second dielectric ink composition is configured to have a thickness of between about 2 μm and 50 μm.

7. The method of claim 6, wherein the layer corresponding to the second dielectric ink composition in the alternating layers of the first dielectric ink compositions and the second dielectric ink composition is configured to have a thickness of between about 7 μm and about 120 μm.

8. The method of claim 7, wherein the ratio between the layer corresponding to the second dielectric ink composition, and the layer corresponding to the first dielectric ink composition is between 1:2 and 1:5.

9. The method of claim 1, wherein the form object in the array of the plurality of reinforced form objects of the second dielectric ink composition within the continuous matrix of the first dielectric ink composition is at least one of: a rod, a peg, an elongated member having a polygonal cross section, and a combination of forms comprising the foregoing.

10. The method of claim 9, wherein the reinforced form object is a cylindrical rod.

11. The method of claim 10, wherein the total volume of the cylindrical rods formed from the second dielectric ink composition in the matrix formed from the first dielectric ink composition is between about 10% (v/v) and about 30% (v/v).

12. The method of claim 11, wherein the diameter pf each cylindrical rod is configured to form a rod sized to have a volume of between about 0.1% (v/v) and about 1.0% (v/v) of the total matrix volume formed of the first dielectric ink composition.

13. The method of claim 1, wherein the reinforced form object is a polygonal network formed by the second dielectric ink composition, forming a closed-cell matrix filled with the first dielectric ink composition thereby forming a honeycomb structure.

14. The method of claim 13, wherein the network forming the polygonal closed cells is formed of a composition comprising organically modified, silicate-based ceramic (ORMODS) co-monomers, having a ceramic constituent, and wherein the first dielectric ink composition is polyester (PES), polyethylene (PE), polyvinyl alcohol (PVOH), poly (vinylacetate) (PVA), poly (methyl methacrylate) (PMMA), Poly(vinylpirrolidone), a multi-functional acrylate, or a combination comprising a mixture of: a monomer, an oligomer, and a copolymer of one or more of the foregoing.

* * * * *